United States Patent [19]

Hobson

[11] Patent Number: 4,616,757

[45] Date of Patent: Oct. 14, 1986

[54] THREE AXIS CORNER BRACKET

[75] Inventor: Willis S. Hobson, Columbus, Ind.

[73] Assignee: Seymour Manufacturing Company, Seymour, Ind.

[21] Appl. No.: 669,827

[22] Filed: Nov. 9, 1984

[51] Int. Cl.$^4$ .............................................. A47F 7/00
[52] U.S. Cl. .................................. 211/189; 211/60.1; 248/300; 403/217
[58] Field of Search .............. 211/189, 60.1; 403/217, 403/218, 219, 399, 398, 400; 248/300

[56] References Cited

U.S. PATENT DOCUMENTS

| | | | |
|---|---|---|---|
| 2,858,266 | 10/1958 | Schneider | 403/400 X |
| 3,011,235 | 12/1961 | Pacheco | 403/217 X |
| 4,192,406 | 3/1980 | Mitchell | 248/300 X |
| 4,272,208 | 6/1981 | Jones | 403/232.1 X |
| 4,449,842 | 5/1984 | Reichman | 403/217 X |

Primary Examiner—Robert W. Gibson, Jr.
Attorney, Agent, or Firm—Woodard, Weikart, Emhardt & Naughton

[57] ABSTRACT

A corner bracket for use as part of a support system wherein a plurality of corner brackets are used in combination with connecting members in the form of lengths of 2×4 lumber, the corner bracket includes a three-sided hollow frame member wherein two of the sides are arranged so as to face one another in a substantially parallel manner with the third side being disposed therebetween and at a right angle thereto so as to define an enclosed channel. Each of the two first sides includes a generally rectangular opening which is compatibly sized to receive a length of 2×4 lumber. The third side has a top edge in common with the top edge of the first and second sides, while the lower opposite edge of the third side is elevated above the lower edge of the first two sides. This configuration creates a third opening which is also sized and arranged to receive a length of 2×4 lumber. The final length of 2×4 lumber is received by the channel which is formed by the three sides such that the three lengths of lumber which are received by each corner bracket define three different axes or degrees of freedom. The support system which is created is adjustable in all three directions.

15 Claims, 6 Drawing Figures

THREE AXIS CORNER BRACKET

BACKGROUND OF THE INVENTION

The present invention relates in general to rack concepts and associated bracketry for receiving and supporting articles, such as firewood. More particularly, the present invention relates to a bracket design which provides adjustability in each of the three axes and is able to be used for general support functions, not merely storage of firewood. While the present invention is suitable for use as part of a system for the support of firewood, it has a variety of other and expanded uses, some of which will be described hereinafter. The ultimate number of such uses may only be limited by one's creativity and ingenuity to design other applications using the present invention as the cornerstone of any such other application.

While at least one other firewood rack is known to exist, its uses are limited to storing firewood. The concept of a three axis corner bracket with the many and varied uses permitted by making the bracket adjustable in three directions, is not known to exist, but for the present invention. The one firewood rack which is known to exist is offered by Chemic Products of Hitchcock, Tex. and is advertised under the name UNI-RACK. The literature which accompanies the product limits its use to "keeping firewood high and dry." The device includes two plastic brackets which are aligned with each other and have openings for the receipt of 2×4 lumber. By varying the length of the lumber, the firewood rack may be made shorter or longer as well as higher or lower. The length may also be varied by sliding one or both brackets along the connecting 2×4 lumber members. However, one dimension which is fixed and is unable to be altered is the depth of the bracket. The bracket is sized, depthwise, taking into consideration the normal length of a log which has been cut as firewood. In order to rigidly fix this depth dimension in an unalterable and nonvariable manner, each bracket includes a pair of corner units which are integrally connected, in an aligned manner, by a cross member plate which is disposed along the lowermost surface of the bracket. This integral cross member plate controls the spacing between its corresponding corner units. Due to the presence of this plate, one degree of freedom, and one plane of adjustability is lost. While this loss not only prevents greater versatility by enabling the user to vary dimensions in this third axis or direction, this loss of one degree of freedom also results in a less versatile product and a product which is in fact really limited to the storage of firewood.

By contrast, the present invention provides a full three axes of adjustability and versatility. This adjustability and versatility is enabled by providing each corner bracket as a separate and independent unit, each one having three openings or channels for receipt of connecting members, such as lengths of 2×4 lumber. Due to the fact that these three openings or channels are arranged in 90° planes relative to each other, and due to the fact that the corner brackets are separate and independent units, these brackets are able to be used as part of a support system not only for the support of logs, but may also be used to create shelving, tables, counters and so forth.

Removal of the cross member plate from the prior device and the addition of a third opening or channel provides a significant improvement over what is offered by the UNI-RACK product of Chemic Products. Further, the present invention includes the additional feature of clearance holes in each face of the corner bracket thereby permitting the connecting members, whether they be lengths of 2×4 lumber or other similar members, to be securely anchored in place in a somewhat permanent manner by the use of fasteners, such as lag screws.

SUMMARY OF THE INVENTION

A corner bracket for use as part of a support system wherein a plurality of said corner brackets are used in combination with connecting members to complete the system according to one embodiment of the present invention comprises a three-sided hollow frame member having first and second sides facing one another and a third side disposed between the first two, the first side being arranged to define a first opening, the second side being arranged to define a second opening, wherein the first and second opening are aligned with each other and are of a similar shape, the third side defining in combination with the first and second sides a channel, the third side further defining a third opening wherein the third opening is of a shape similar to the first and second openings and all of such openings are of a shape similar to the shape of the channel.

One object of the present invention is to provide an improved corner bracket for a support system.

Relates objects and advantages of the present invention will be apparent from the following description.

DESCRIPTION OF THE PREFERRED EMBODIMENT

Figure 1:
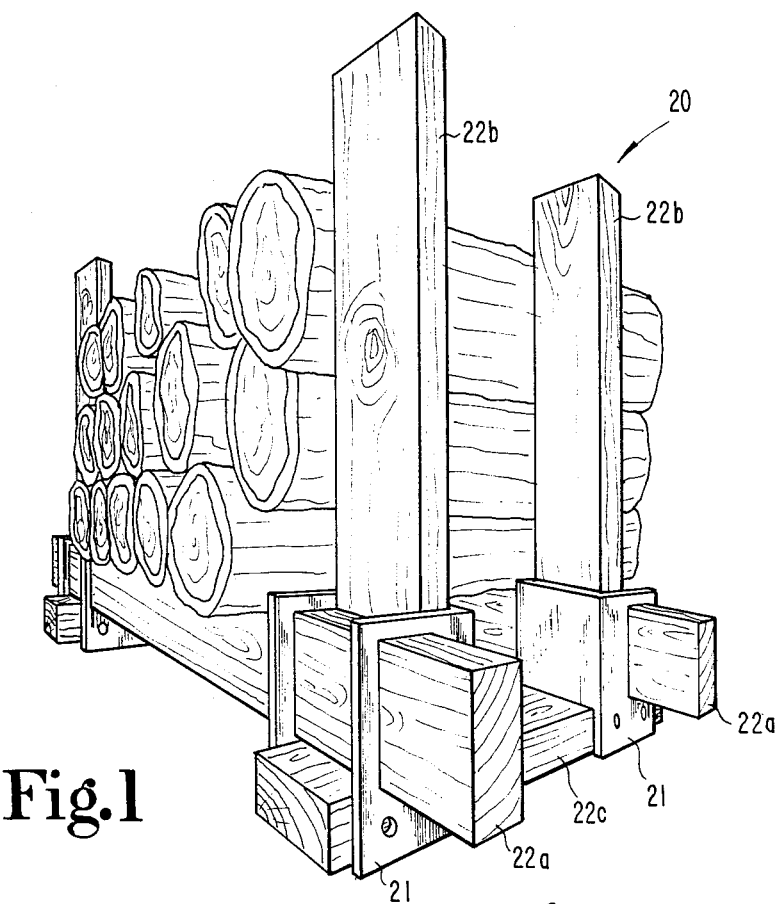
FIG. 1 is a partial perspective view of a support system incorporating independent corner brackets according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, there is illustrated a support system 20 which includes a plurality of corner brackets 21 and connecting members 22a–22c. In the illustrated embodiment of FIG. 1, the connecting members are lengths of 2×4 lumber which have been precut to the required length and are thereafter disposed in channels and passageways existing within and defined by the sides of the various corner brackets.

The FIG. 1 illustration is intended to be a partial illustration, one end, of a firewood support rack wherein the individual firewood logs are laid across and supported by connecting members 22a. Connecting members 22b provide the end support to prevent the logs from rolling off the end, and it should be understood that there is a virtually identical arrangement at the opposite end incorporating two or more corner brackets, two more connecting members 22b and one additional connecting member 22c. Depending on how long one wishes the rack to be, connecting members 22a are cut to that desired length leaving enough clearance for their ends to slide through aligned openings existing in the corner brackets. These aligned openings are slightly above ground level, thereby enabling the stacked firewood logs to be above ground level and thereby avoid rotting of the wood and nesting by insects and small animals.

Connecting members 22b are precut to the desired length based upon the height of the rack which the user desires. These members fit into a formed channel within their corresponding corner bracket, and the length of the logs which one has cut will to some degree control the length of the connecting member 22c. Connecting member 22c fits through an opening along the lower edge of each corner bracket, and as should be understood, if member 22c is of a sufficient length, it will actually extend beneath each member 22a while members 22b will be oriented along side of members 22a, though somewhat normal thereto and will also abut against the top surface of connecting member 22c. The positional relationship of these various connecting members and their substantially perpendicular and parallel arrangement relative to each other will be described still further when reference is made to FIGS. 2, 3 and 4.

Figure 2:
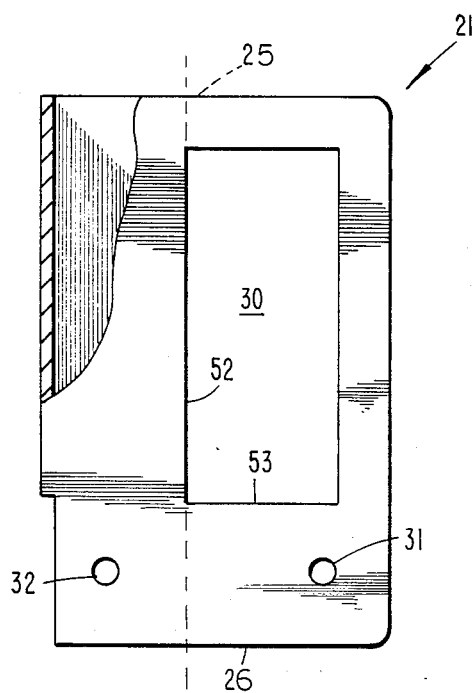
FIG. 2 is a fragmentary side elevation view of the FIG. 1 corner bracket.

Referring to FIG. 2, there is illustrated a front elevation view of one corner bracket 21. As should be understood, each corner bracket 21 is virtually identical to every other corner bracket within the system, thus they may be used interchangeably and in a somewhat universal manner, and in fact oriented in any particular manner to suit the particular system structure or design. While a log support rack has been partially illustrated in FIG. 1, other systems such as a shelving system (FIG. 5) and a table (FIG. 6) are also envisioned utilizing this unique corner bracket style, and those other systems will be described later.

Corner bracket 21 is a formed metal member arranged with three integral sides while being open on the top and bottom as well as open on the fourth side. In order to fully appreciate the entire configuration of corner bracket 21, reference should also be made to FIGS. 3 and 4. Sides 25 and 26 are substantially parallel to one another and in virtually all respects are identical. Intermediate side 27 which, as mentioned, is integral with sides 25 and 26, is substantially perpendicular to sides 25 and 26. Although the various sides of corner bracket 21 obviously have thickness, for the convenience in describing the geometric arrangement, it is helpful to refer to the various sides as lying within imaginary geometric planes. Consequently, the geometric planes containing sides 25 and 26 are parallel and the geometric plane containing side 27 is perpendicular to the planes of sides 25 and 26. Although with a formed metal member there is by necessity some inside corner radius, this is kept to a minimum so as to provide a better and tighter fit with the lengths of 2×4 lumber which are received by the corner brackets.

Sides 25 and 26 each define a corresponding rectangular opening 30 and a pair of fastener clearance holes 31 and 32. The width of opening 30 measures just slightly over 1½ inches, while the length measures just slightly over 3½ inches. As is well known, the actual dimensions for 2×4 lumber are 1½ by 3½ inches. Consequently, opening 30 is sized specifically to receive with a reasonably close fit lengths of 2×4 lumber. Since opening 30 in side 25 is aligned with corresponding opening 30 in side 26, a length of 2×4 lumber extending through these two openings will be properly aligned in a somewhat straight manner, wherein the longitudinal axis of the 2×4 lumber will be substantially normal to the geometric planes containing in sides 25 and 26 and substantially parallel to the geometric plane containing side 27.

Figure 4:
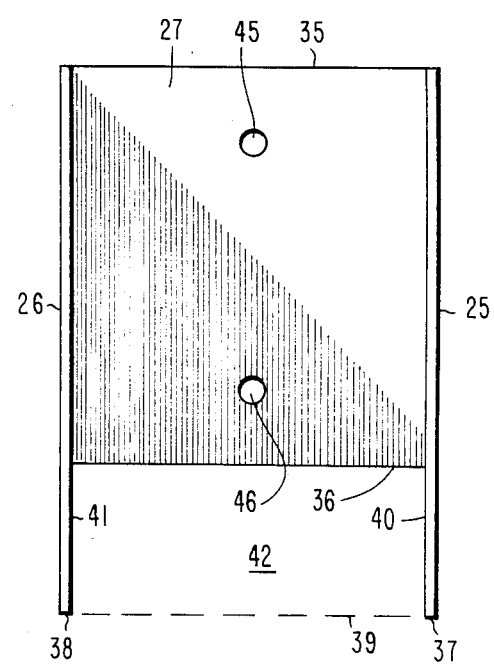
FIG. 4 is a side elevation view of the FIG. 1 corner bracket.

Looking more particularly to FIG. 4, it is shown that side 27 while having a top edge 35 which is in common with the top edges of sides 25 and 26, such that they all lie within the same imaginary geometric plane, the lower edge 36 of side 27 is recessed above the lower or bottom edge 37 of side 25 and edge 38 of side 26. Broken line 39 represents the imaginary geometric plane which includes lower or bottom edges 37 and 38. It should be appreciated that the rectangular opening defined by inner surfaces 40 and 41, by edge 36 and by imaginary plane 39 is substantially the same size and shape as openings 30. Similarly, this defined rectangular opening 42 is suitable to receive in a relatively snug and aligned manner a length of 2×4 lumber. Similar in size to openings 30, this defined opening or recess measures slightly over 1½ inches by slightly over 3½ inches.

Disposed in side 27 are fastener clearance holes 45 and 46 which have a similar purpose to clearance holes 31 and 32. It is also to be understood that there is an additional pair of clearance holes 31 and 32 disposed in side 26, and that it is fastener or clearance holes 31 and 32 which are used to secure the corresponding corner bracket to the length of 2×4 lumber which extends through opening 42. Clearance holes 45 and 46 are used to anchor or secure a final connecting member to the corresponding bracket, and this member extends in a direction substantially parallel to the three sides. Although clearance holes are provided, their use is not mandatory. If a rack or similar structure is to remain as temporary or adjustable, lag screws may be omitted.

Figure 3:
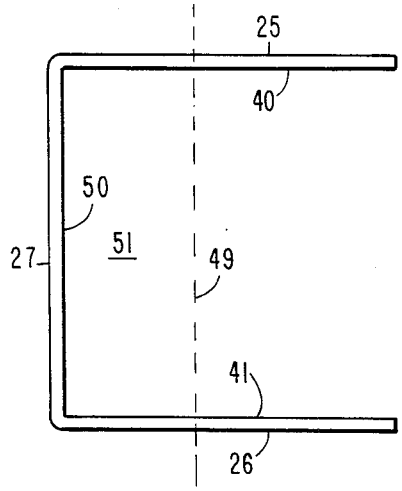
FIG. 3 is a top plan view of the FIG. 1 corner bracket.

Returning briefly to a review of FIG. 1, it is illustrated that connecting members 22b extend vertically down into their corresponding corner brackets. As should be clear from a review of the FIG. 3, FIG. 4 and FIG. 1 illustrations, connecting member 22b is intended to be received by side 27 as well as by sides 25 and 26. Consider broken line 49 as representing the outermost surface of connecting member 22b. The rectangular area which is then bounded by inside surfaces 40 and 41 and by broken line 49 and inside surface 50 is a rectangular space substantially identical in length and width dimensions to openings 30 as well as opening 42. This particular portion of the interior space of the corner bracket 21 has been given a reference numeral of 51 to define the particular channel that is created by the three inside surfaces as well as defining the opening which is created when broken line 49 is included. By allowing connecting members 22b to be installed in this manner, their widthwise receipt is controlled by inside surfaces 40 and 41 and while they are actually restrained by the corner bracket on only one side, it is to be understood that crossing connecting members 22a which extend through openings 30 assist in support of the otherwise unsupported outer surface of member 22b. In order for this combination and particular arrangement to be achieved, it is to be understood that broken line 49 which represents an imaginary geometric plane is substantially coincident with edge 52 of openings 30, see FIG. 2.

A further relationship which sould be understood is that lower edge 36 is substantially in line with or lies within the same imaginary geometric plane as lower edge 53 of openings 30. Consequently, as connecting member 22c extends through opening 42, it will extend just below the lower edge of connecting member 22a. While there might be very sligth contact between the two, that will depend upon the tolerance variation on the actual lengths of 2×4 lumber which are used. The point to be realized though is that by proper dimensioning and spacing of lower edge 36 and openings 30, the three connecting members, which in the preferred embodiment are lengths of 2×4 lumber, are all in nearly contiguous contact with each other thereby adding to the overall stability of any support structure or system which is created using these connecting members and the disclosed corner brackets.

One benefit of the present invention is its low cost and ease of manufacturing. The various clearance holes and openings may be stamped in flat sheet stock prior to bending and the entire machining and forming operation may be done in an automated manner. A further advantage of the independent corner brackets, as opposed to the interconnected corner brackets of at least one prior system, is that the distance between connecting members 22a may be infinitely varied simply by sliding the corner brackets along connecting member 22c as it extends through opening 42. Another benefit of the somewhat universal nature of this three axis corner bracket and the elimination of the connecting plate between aligned corner units is that the bracket may be usable on systems other than merely for racks to store and receive firewood logs.

Figure 5:
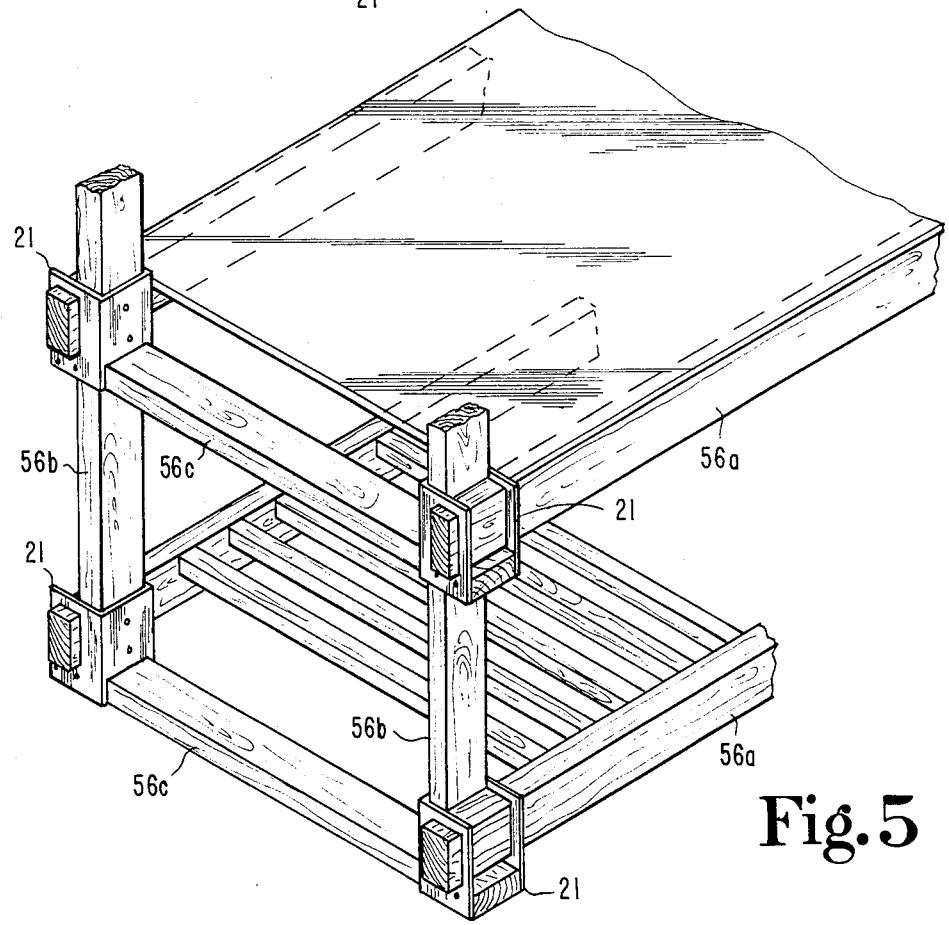
FIG. 5 is a partial perspective view of a shelving arrangement incorporating the FIG. 1 corner brackets.

Consider the partial illustration of FIG. 5 wherein the corner brackets of this invention are utilized as part of a shelving system. In this particular arrangement a corner bracket 21 is positioned at each corner of each shelf. Connecting members 56a establish the length or width of the shelving while connecting members 56b determine the shelf-to-shelf spacing and connecting members 56c establish the depth of each shelf. Depending on whether the shelving system is free-standing or to be anchored against a wall, it is possible to orient brackets 21 so that the outer surface of side 27 is facing into the room or facing against the wall. If bracket 21 is oriented so that the outer surface is facing the wall, the two clearance holes 45 and 46 may be used with fasteners to anchor the bracket directly to the wall. However, due to the particular design of brackets 21, the shelving system will be suitably stable even if it is designed as a free-standing unit. Connecting members 56c should be cut to the desired length and sized so as to not extend beyond the outer edge boundary of the connecting brackets. Connecting members 56b should be set at the desired height for shelf-to-shelf spacing. If the corner brackets are turned so that the outer surface of side 27 is outwardly facing, then a single, although much longer, length of 2×4 lumber could be used instead of the vertical stack of connecting members 56b. It is envisioned in this alternate configuration that a single length extends up through the brackets and is secured to each bracket by means of fasteners using the two clearance holes in side 27. A cross member 56c then extends into the bracket, is secured thereto by fasteners into clearance holes 31 and 32 and abuts up against connecting member 56b (see FIG. 6). This provides a sturdy outer frame and the length of the shelving is controlled by connecting members 56a. These members 56a simply extend through openings 30 and thereafter receive some type of slats or solid wood surface in order to provide the necessary shelf support for books or similar objects.

As illustrated, members 56c extend the full depth of each shelf such that members 56b abut up against their corresponding member 56c. The lower end of each member 56b is secured by means of fasteners into clearance holes 45 and 46. The upper end of each member 56b is nailed to its corresponding cross member 56c. If it is desired to make each shelf stackable, the intersection of the top of member 56b and member 56c may be dowel pinned with the pins being removable. When a single length is used for all members 56b, members 56c are not load-bearing and only act as stabilizing members.

Figure 6:
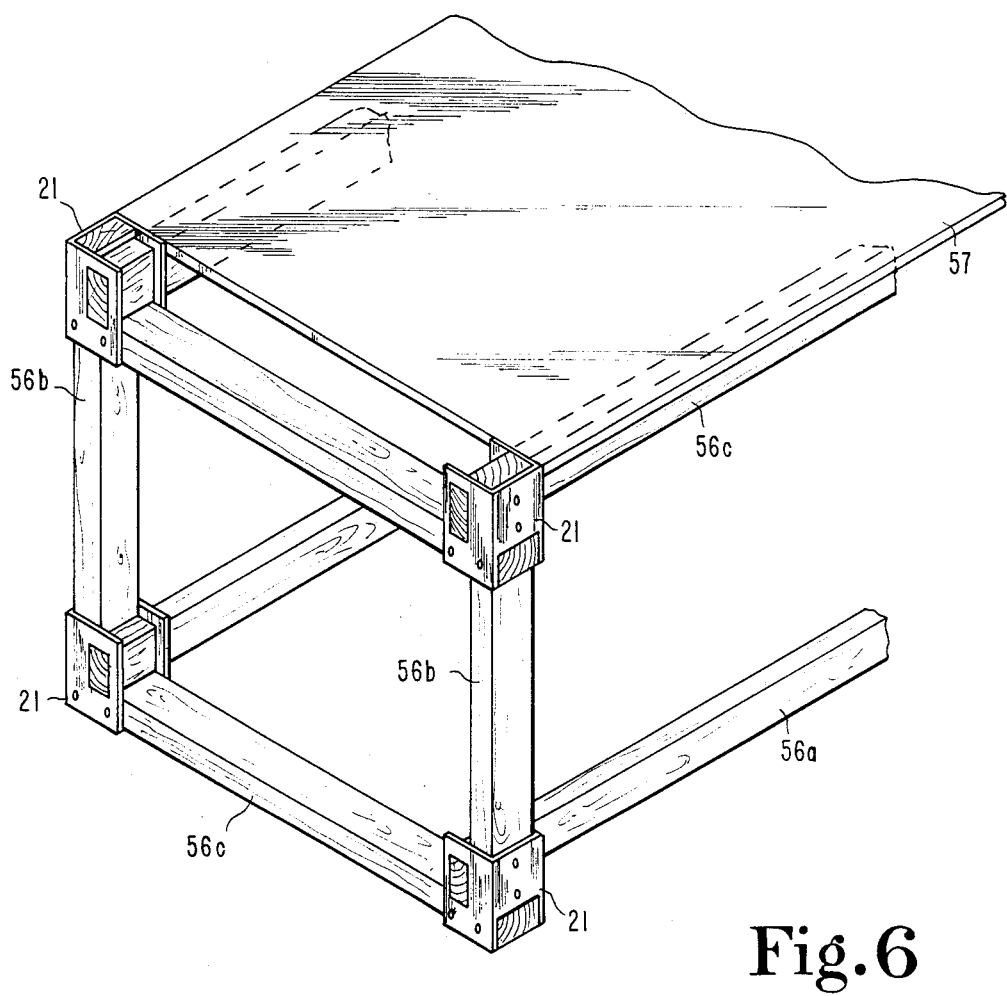
FIG. 6 is a perspective view of a table constructed using the FIG. 1 corner brackets.

Referring to FIG. 6, a table arrangement is illustrated and is structured in much the same manner as the shelving system of FIG. 5. In this particular arrangement, connecting members 56a and 56c perform much the same function as they did in the FIG. 5 arrangement. However, connecting member 56b is of a single height and does not extend upwardly through the second level of corner brackets. Table top 57 may be disposed across the top surface of the various corner brackets or, as would more likely be the case, is placed on top of the top surface of connecting members 56a and 56c which provide the uppermost surface prior to placement thereon of tabletop 57. Since connecting member 56c as it passes through openings 30 is recessed below the top edge of the corresponding corner brackets by approximately ½ inch, that ½ inch lip provides a convenient abutment surface for tabletop 57. Regardless of the particular arrangement of the corner brackets and the connecting members and regardless of whether or not shelving systems are desired or tabletops or counters or log racks, the versatility of the present invention and the fact that it is infinitely adjustable in each of the three axes with three degrees of freedom means that it is in fact well suited, not only for all of the systems described, but for as many different and varied systems as one is able to conceive of and create.

Although the brackets 21 have been illustrated in only two orientations, it is to be understood that the brackets can be rotated about each axis in order to offer greater variety and versatility. As systems are created and the load-bearing members analyzed, the brackets may be arranged to offer the greatest support and stability. The key is that regardless of the orientation of the brackets, they still enable a three axis configuration and are able to receive three lengths of 2×4 lumber.

While the invention has been illustratd and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A corner bracket for use as a part of a support system wherein a plurality of said brackets is used in combination with connecting members to complete said system, said corner bracket comprising:

a three-sided hollow frame member having first and second sides facing each other and a third side disposed between said first and second sides;

said first side being designed and arranged to define a first opening, said first opening being suitably sized and shaped for receipt of a first connecting member;

said second side being designed and arranged to define a second opening, said first and second openings being aligned with each other and being of a similar shape;

said third side defining in combination with said first and second sides, a channel which is suitably sized and shaped for receipt of a second connecting member, and said third side further defining a third opening, said third opening being suitably sized and shaped for receipt of a third connecting member; and said third opening being of a shape similar to said first and second openings all of said openings being of a shape similar to said channel.

2. The corner bracket of claim 1 wherein said first and second sides are substantially parallel to each other.

3. The corner bracket of claim 2 wherein said third side is substantially perpendicular to said first and second sides.

4. The corner bracket of claim 1 wherein said connecting members are lengths of 2×4 lumber and said first, second and third openings and said channel are all sized and arranged to receive said lengths of 2×4 lumber.

5. The corner bracket of claim 4 wherein said first, second and third openings and said channel are positioned and spaced relative to each other such that a length of 2×4 lumber received by said first and second openings and a length of 2×4 lumber received by said third opening are nonintersecting.

6. The corner bracket of claim 5 wherein said first and second openings and said channel are positioned and spaced relative to each other such that a length of 2×4 lumber received by said first and second openings and a length of lumber received by said channel are nonintersecting.

7. The corner bracket of claim 1 wherein each of said sides includes a plurality of clearance holes disposed therein.

8. A corner bracket for use as a part of a support system wherein a plurality of said brackets is used in combination with connecting members to complete said system, said corner bracket comprising:

a first substantially planar wall portion defining a first opening lying within a first plane, said first opening being suitably sized and shaped for receipt of a first connecting member;

a second substantially planar wall portion defining a second opening lying within a second plane, said second substantially planar wall portion being substantially parallel to said first substantially planar wall portion and said second plane being substantially parallel to said first plane;

a third substantially planar wall portion defining a third opening lying within a third plane, said third opening being suitably sized and shaped for receipt of a second connecting member and said third substantially planar wall portion being substantially perpendicualr to said first substantially planar wall portion and said third plane being substantially perpendicular to said first plane;

said first and second openings being aligned with each other and of substantially the same size and shape; and said first, second and third wall portions defining an interior, hollow channel, said hollow channel being suitably sized and shaped for receipt of a third connecting member.

9. The corner bracket of claim 8 wherein each of said three wall portions are substantially rectangular in peripheral contour and each having a first outer edge, said first outer edges lying within a first common geometric plane.

10. The corner bracket of claim 9 wherein each of said three wall portions include a second outer edge which is opposite to the corresponding first outer edge and where the second outer edges of the first and second wall portions lie in a second common geometric plane which is substantially parallel with the first common geometric plane.

11. The corner bracket of claim 10 wherein the second outer edge of said third wall portion is disposed within a third geometric plane which is disposed between said first and second common geometric planes and is substantially parallel therewith.

12. The corner bracket of claim 8 wherein said openings and channel are suitably sized and arranged to receive lengths of 2×4 lumber as said first, second and third connecting members.

13. The corner bracket of claim 12 wherein said first, second and third openings and said channel are positioned and spaced relative to each other such that a length of 2×4 lumber received by said first and second openings, as said first connecting member, and a length of 2×4 lumber received by said third opening, as said second connecting member, are nonintersecting.

14. The corner bracket of claim 13 wherein said first and second openings and said channel are positioned and spaced relative to each other such that a length of 2×4 lumber received by said first and second openings, as said first connecting member, and a length of 2×4 lumber received by said channel, as said third connecting member, are nonintersecting.

15. An adjustable support rack for receiving articles such as firewood, said adjustable support rack comprising:

an arrangement of four corner brackets, each bracket arranged so as to define three channel-like passageways, a first one of said passageways being nonintersecting with the second and third passageways and said second and third passageways intersecting each other;

an arrangement of eight connecting members, there being one corresponding connecting member received within the first passageway of each corner bracket and one corresponding connecting member received within the second passageway of each corner bracket, said corner brackets arranged in aligned pairs wherein the connecting member received within the second passageway is common to the corresponding aligned pair of corner brackets, said aligned pair being movable along said common connecting member in order vary the spacing between said aligned pair; and .

said arrangement of four corner brackets being configured with one disposed at each corner of said rack and said eight connecting members being configured wherein four of said eight connecting members interconnect the four corner brackets and four of said eight connecting members are arranged such that one each extends upwardly from each of the four corner brackets.

* * * * *